UNITED STATES PATENT OFFICE.

JOSEPH M. DEERING, OF BOSTON, MASSACHUSETTS, ASSIGNOR TO J. P. CILLEY, OF ROCKLAND, MAINE.

IMPROVEMENT IN FERTILIZING COMPOUNDS.

Specification forming part of Letters Patent No. 125,939, dated April 23, 1872.

Specification describing a certain Compound called "Fish" or "Lobster Guano," invented by JOSEPH M. DEERING, of Boston, county of Suffolk and State of Massachusetts, to be used as a fertilizer.

The nature of my invention consists in mixing with fish or lobster chum, or other refuse fish-matter, carbolic acid; or, more particularly, articles of little or no value but impregnated with carbolic acid, as tar-water, ammoniacal-water, spent lime, gas-water from gas-works or kerosene-factories, dry earth, brick-dust, or powdered peat, air-slaked lime, gypsum, and seaweed.

To prepare this compound, the fish and lobster chum, which is very difficult to transport from its quick putrefaction and offensive smell, is mixed with a solution of spent lime or gas-water, and thus transported, without the usual difficulty, to the place of preparation. It is here spread on a floor or other suitable place, previously covered with dry earth, peat, or brick-dust. Over the fish or lobster chum thus placed a layer of lime is placed—the air-slaked lime or unmerchantable lime from lime-kilns is preferred; then follows a covering of seaweed in its usual wet condition; over this a layer of ground gypsum; and then a layer of dry earth or peat. These layers may be repeated till the desired quantity is obtained. The whole pile is then allowed to decompose slowly. The process of decomposition may be increased by keeping the pile wet, or by adding sulphuric acid; or may be retarded by keeping it dry, or adding tar or gas water.

The best results are obtained from a slow decomposition of the compound, as the ammonia and phosphuretted hydrogen thrown off by the chum and seaweed are absorbed by the lime and gypsum and converted into scarcely soluble compounds, valuable as manures, the dry earth or peat on top absorbing and retaining any excess of other inorganic substances or effluvia.

All of the above-mentioned ingredients except gypsum are of small value, and have in general practice been thrown one side as valueless and offensive; but when combined as above make a very valuable fertilizer, whose effects are immediate on vegetation, and, what is of greater value for general use, its fertilizing power and effects remain for years on the soil.

Having thus particularly described and set forth the preparation of my invention, I claim, and desire to secure by Letters Patent of the United States—

A compound substantially in the proportions and for the purposes set forth.

JOSEPH M. DEERING.

Witnesses:
 JONA. P. CILLEY,
 J. G. LOVEJOY.